July 9, 1957     A. VON EUW     2,798,774
BEARINGS

Filed May 3, 1954     2 Sheets-Sheet 1

INVENTOR.
ADOLFO VON EUW
BY
Kenyon & Kenyon
ATTORNEYS

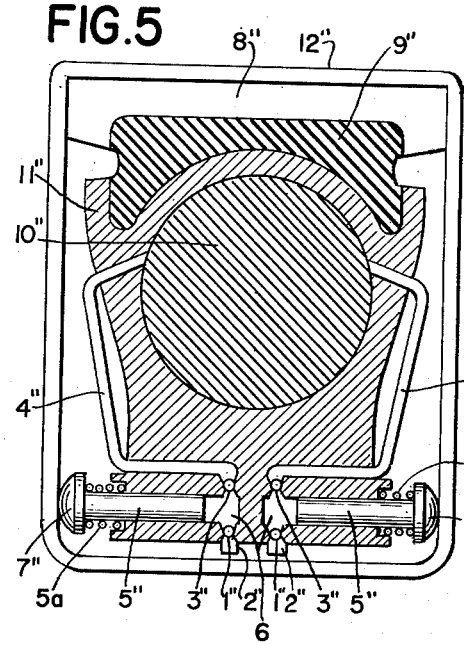
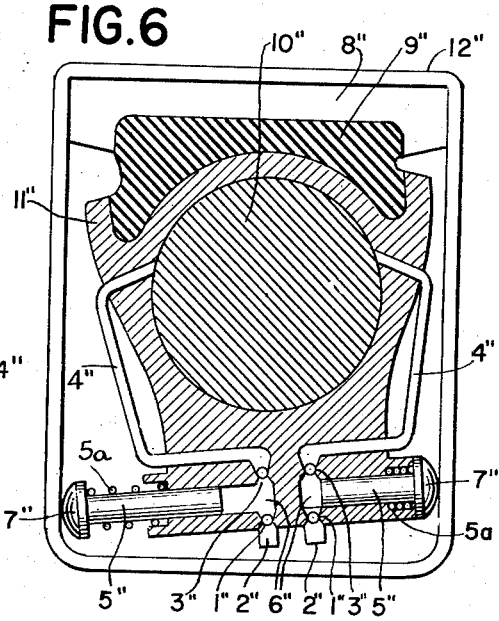
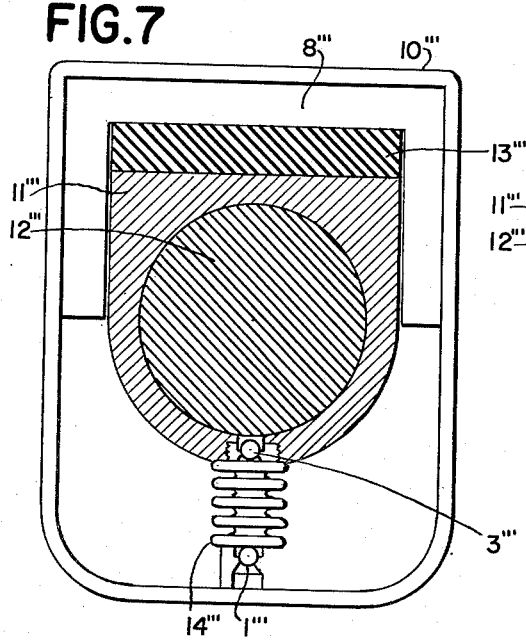
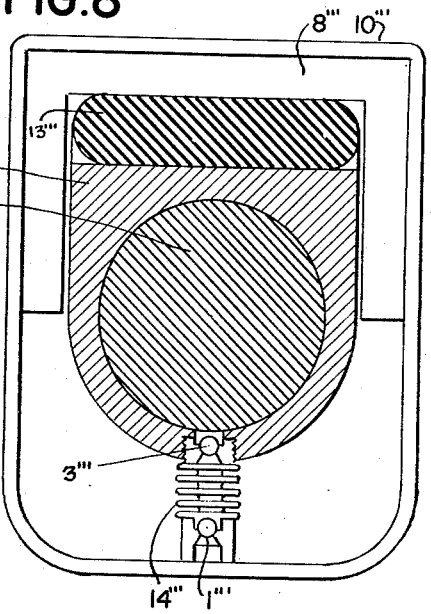

United States Patent Office 2,798,774
Patented July 9, 1957

2,798,774
BEARINGS

Adolfo von Euw, Mexico City, Mexico

Application May 3, 1954, Serial No. 427,120

7 Claims. (Cl. 308—84)

This invention refers to improvements in bearings.

An object of the invention is to assure an immediate, reliable and abundant lubrication between the static and dynamic elements in bearings of railways, mills, mixers, and general machinery, and to assure a maximum degree of selfalignment and shock and vibration absorbing ability through the incorporation of elastic devices or mechanisms to the same effect.

The invention consists basically of the utilization of certain movements of journal, bearing, oil sump, point of load application, supports, etc. in relation to each other for the operation of lubrication pumps either directly or through a mechanism of transmission of said movements, and improving, enlarging or directing said movements by the design of the elastic devices or special mechanisms to the same effect, and for the absorption of shock and vibration.

Of all the possible relative movements obtainable the invention refers specially to those in direction of the load and those swinging or oscillating movements around a real or imaginary axis (not necessarily fixed) which is approximately parallel to the axis of the rotating element.

Figure 1:
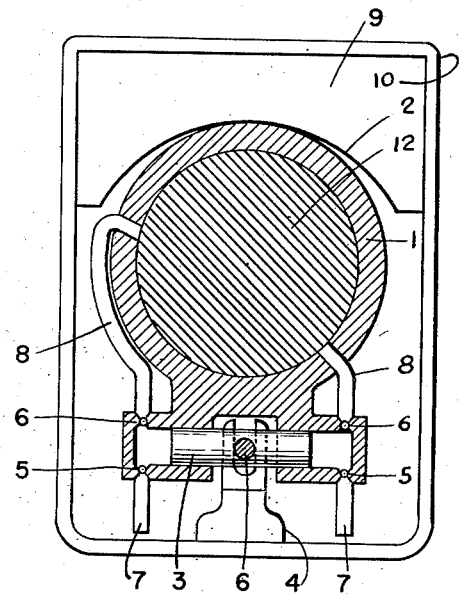

Figure 1 shows one mode of application to railway journals. In this example the swinging effect is favored through a rolling contact between the bearing 1 and the static element or load supporting member 9. The mechanism is shown in the position of stand-still or at the precise moment at which a swinging motion passes through the center position. This and all other figures are cross sections.

Figure 2:
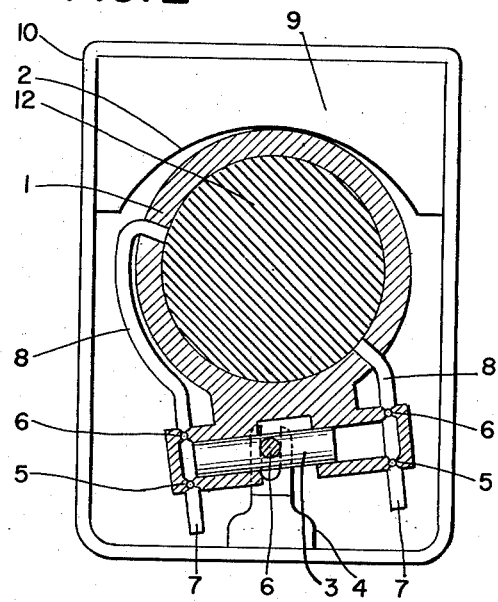

Figure 2 shows the same bearing at one extreme position of a movement which is provoked in this case by the horizontal tractive effort of the locomotive or by the application of brakes or any other accelerating or decelerating force.

Figure 3:
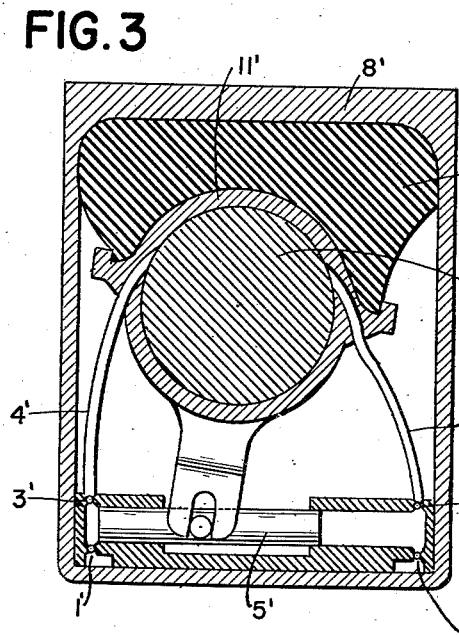
Figure 4:
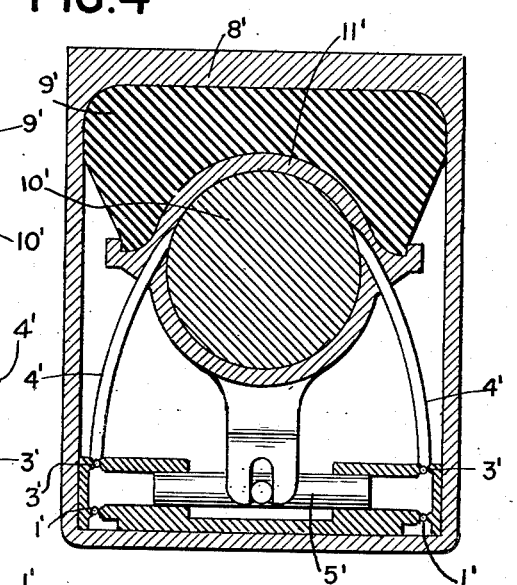

Figures 3 and 4 show a bearing with its pump in a fixed position in relation to the oil sump and, in this case, fixed in relation to the load supporting member 8'. An elastic element 9' is provided between the bearing 11' and the member 8' (top of journal box) with the triple object of favoring the movements which operate the pump and of securing a maximum degree of selfalignment and of absorbing shocks and vibrations. The elastic element can be of any material such as rubber, synthetic rubber, plastic, metal which may be elastic by its nature or by its shape (springs, etc.) or any organic, inorganic or synthetic material or mixture or composition which has the desired characteristics of elasticity. Its conformation, as well as the conformation of the elements which are separated by the elastic insert, may vary in each case with the object of producing a movement with more or less effort and which may limit the extent of the movement and which may produce the desirable equilibrium of the static load on the axle 10'. Furthermore, the choice of material, or the conformation of the elements which are separated by said material, will depend on practical considerations derived from load, temperature, nature of the equipment in which the bearing is installed, etc. In Fig. 3 the assembly is shown at one end of its movement, while Fig. 4 shows it in the central position.

Figures 5 and 6 show another mode of application to railway journals. In this example also the swinging effect is favored through the insertion of an elastic element 9" between the bearing 11" and the static element or load supporting member 8", which also assures a maximum degree of selfalignment and a certain shock and vibration absorbing capacity. Fig. 5 shows the assembly under discussion in a central position and Fig. 6 shows it at one extreme position in its movement.

Figures 7 and 8 show another mode of application to railway journals. In this example a linear movement, roughly in the direction of the load, is obtained by the absorption of shocks and vibrations in an elastic element 13''' inserted between the bearing and the static element or load supporting member 8. Figure 7 shows the assembly while shock or vibration compress the elastic insert 13''' while Figure 8 shows the same assembly while the compensating movement relieves part of the load from the elastic insert 13'''.

In Figures 1 and 2 the movement is caused by any external application of effort and is favored and controlled by a contact between bearing and static element, which is theoretically linear due to the difference in curvature of the corresponding contact surfaces. The conformation of the two curves of contact previously mentioned can be designed in each case in a way to produce a movement requiring more or less effort and to limit the extension of the movement and to produce a desirable equilibrium of the static load on the bearing. Furthermore, the conformation of the contact surfaces will be adapted to their practical requirements which derive from the material, the load and other considerations.

In Figs. 1 and 2 the axle 12 rolls in bearing 1 on which is movably supported the static element or load supporting member 9 having a relatively rigid curved surface 2. As shown in the drawings, the radius of curvature of 2 is greater than of 1. The pump shown is of the double acting plunger type 3, fixed in its center by a pivot 4. This type of pump is one of the many types which are applicable and serves as an illustration of an example. The difference in the position which is occupied by the bearing in Figs. 1 and 2 show the variations of volume which are obtained in the cylinders of the pump, which in turn causes the pumping effect in combination with check valves 5 and 6. The lubricant is drawn from the sump in the bottom of the journal box 10 through pipes 7 and is delivered to the friction surfaces through appropriate conduits 8. The point of application is shown as an example only, as their exact location depends on detail design and working conditions of each bearing. The cylinders of the pumps are shown as being an integral part of the bearing which does not mean that they could not be connected by bolting, welding or any other means.

In the embodiment shown in Figs. 3 and 4 the oscillating movement of the bearing is based on an elastic element 9' which is provided between the bearing 11' and the load supporting member 8' (top of journal box) with the triple object of favoring the movements which operate the pump and of securing a maximum degree of selfalignment and of absorbing shocks and vibrations. The elastic element can be of any material such as rubber, synthetic rubber, plastic, metal which may be elastic by its nature or by its shape (springs, etc.) or any organic, inorganic or synthetic material or mixture or composition which may have the desired characteristics of elasticity. Its conformation, as well as the conformation of the elements which are separated by the elastic insert, may vary in each case with the object of producing a movement with more or less effort and which may limit the extension of the movement and which may produce the desirable equilibrium of the static load on the axle 10'. Furthermore, the choice of material, or the conformation of the elements which are separated by said material, will depend on practical considerations derived from load, temperature, nature of the equipment in which the bearing is installed, etc. The other difference consists in that the pump is fixed in relation to the oil sump (in this case also in relation to the point of load application) rather than in relation to the bearing. The pump plunger 5' moves on pivot 6' within a cylinder 7' fixed at the bottom of the journal box 8'. Check valves 1' are situated between the cylinder and the sump, and valves 3' connect the cylinder with flexible conduits 4' which lead the lubricant to selected points of contact between the bearing and the axle.

In the embodiment shown in Figs. 5 and 6 the movement of the bearing is favored by the insertion of an elastic element such as rubber, synthetic rubber, plastic, metal which may be elastic by its nature or by its shape (springs, etc.) or of any organic, inorganic or synthetic material or a mixture or compositions which may have the desired characteristics of elasticity. Its conformation, as well as the conformation of the elements which are separated by the elastic insert, may vary in each case with the object of producing a movement with more or less effort and which may limit the extension of the movement and which may produce the desirable equilibrium of the static load on the axle 10". The axle 10" rolls in bearing 11" which, as stated above, is cushioned from the supporting member 8" by an elastic member 9", which permits a lateral swinging movement of the bearing with variation in the traction, etc. In this embodiment, the lubricant pump or pumps may be built into the bearing as shown. 6" designates two cylinders bored in the lower portion of the bearing or journal. Each has a plunger or piston 5" biased by a spring 5a. The pistons preferably have rounded heads 7", permitting tilting of the journals and pumps while maintaining contact of the head with the interior of the journal box 12". The sump is in the lower portion of the journal box, and 1" and 3" are the check valves. Lubricant is drawn into the pump cylinder through ducts 2" and pumped to the bearing surface through lines 4".

It is understood that in the embodiment of Figs. 5 and 6 the choice of elastic material, or the conformation of the elements which are separated by said material, will depend on practical considerations derived from the load, temperature, nature of the equipment in which the bearing is installed, etc. The pump shown in this example is of two plungers equipped with springs. It is however understood that any pump which can take advantage of the reciprocal or oscillating movement of the bearing can be employed. Another of many variations of localization of the oil lead tubes is shown. Although the cylinders of the pumps are shown as being integral with the bearing, they may optionally be installed by bolts, welding or other suitable means.

In the embodiment of Figs. 7 and 8 I obtain a roughly linear reciprocal movement in the direction of the load as well as some oscillating and swinging movement in the direction of the axis of the shaft or journal. This movement is favored by the insertion of an elastic element. The elastic material may be any such as rubber, synthetic rubber, plastics, metal which may be elastic by its nature or by its conformation (springs, etc.) or any natural or synthetic material or mixtures or compositions which have the desirable characteristics of elasticity. The elastic material and its conformation, as well as the conformation of the elements which are separated by the elastic insert may vary in each case in a manner to produce a movement requiring more or less effort or to limit some in its extension and in order to produce a desirable equilibrium of the static load on the shaft or journal. Furthermore, the choice of the material and of the conformation of the elements separated by same will depend on practical considerations which derive from load, temperature, nature and general operating conditions of the equipment in which the bearing is installed.

In Figs. 7 and 8, the axle 12''' rotates in bearing 11'''. Elastic member 13''' is interposed between the bearing and the load application surface 8'''. The sump is in the bottom of the journal box 10'''. The elastic tube type pump 14''' has a suction tube 1''' immersed in the lubricant, and forces lubricant through the channel or conduit 3'''.

The movement which is produced at the moment of starting of the bearing and journal, and during the normal or abnormal operation of the bearing, is reduced to a reciprocating movement of a plunger or of a cylinder or of an elastic tube or any type of pump which functions on the principle of reciprocal movements. Since the end of the suction tube of the pump is submerged in lubricant the pump forces same through the oil tubes to any point from which it has favorable access to the friction surface.

Although the pump shown in this example is of the type of an elastic or extensible tube, my invention is not limited to this type of pump. In this case, the pump forces the lubricant directly to the friction surface of the bearing although also in this case discharge tubes can be utilized to direct the lubricant to any other point. The pump is shown as being mounted by a thread, although it could be an integral part of the bearing, or connected to same by any other means.

Included among the advantages of my invention are the following:

1. Injection of lubricant between the load surfaces of journal and bearing actually before the journal begins turning.
2. Automatic alignment between the static element and the journal in all directions or in some.
3. Ability to absorb shocks and vibrations in any or all directions.
4. Lubrication at a desirable pressure and at the exact point where it is necessary.
5. Reliable and abundant lubrication and cooling in service.
6. An ample flow of lubricant without external mechanisms.
7. Highly reliable operation.
8. Extremely simple automatic lubrication.

It will be seen that my invention, in its various embodiments, provides a means for utilizing the vibratory and tractional displacements involved in the transmission of tractive or other power for the supply of a positive feed of a lubricant to bearings. This I accomplish by maintaining the journal in such a manner that it is movable, within fixed limits, relative to the load or weight to be supported, and incorporating with it a pump or pumps in such manner that the motion of the journal actuates the pump mechanism and forces lubricant to the bearing surface. In my particularly preferred embodiments I take advantage of those movements of the journal swinging or oscillating around an axis approximately parallel to the axis of the element that rotates within the bearing. This I may do either by providing flexible or elastic members between the journal and the load or by providing relatively rigid surfaces of different degrees of curvature as contact points between the load and the bearing, or by analogous structural means. When utilizing the interposed elastic member I can take advantage of either motion swinging about the above described axis or a substantially reciprocal movement approximately in the direction of the load.

The utilization of swinging or oscillating movements around an axis approximately parallel to the axis of the rotating element is particularly advantageous in the case of railroad bearings.

In any event, it is clear from the specification and drawings that my novel bearing functions by a swinging, vibratory or oscillating movement of the journal which in turn actuates a pump incorporated in, attached to, or working in cooperation with the journal, which is adapted to draw a lubricant from a sump preferably situated in the journal box and deliver it to a selected point of friction between the rotating part or axle and the bearing.

As mentioned in the specification my invention also provides a means for selfalignment which is also particularly desirable in the case of railroad bearings. I should point out that the term "selfaligning" is used in this specification in the same sense in which it is used in the art. Actually, the term means that the stresses are taken out of such momentary misalignment as is inevitable under the prevailing load conditions.

As is evident from the preceding description, the invention is not limited to the specific embodiments which have been described in detail, but includes the modifications coming within the scope of the claims.

What is claimed is:

1. In a bearing assembly, an axle supported for rotation in a bearing, a load-supporting member, elastic means interposed between the bearing and the load-supporting member permitting relative motion therebetween about an axis substantially parallel to the axis of said axle, a pumping device having actuating means and a conduit coupling said device to said bearing to supply lubricant to the interface between the axle and the bearing, and means responsive to said relative motion between the bearing and the member and coupled to said pump actuating means to operate said device thereby to supply a lubricant under positive pressure to said interface.

2. In a bearing assembly, an axle support for rotation in a bearing, a load-supporting member, elastic means interposed between the bearing and the load-supporting member permitting relative motion therebetween, a pumping device having actuating means and a conduit coupling said device to said bearing to supply lubricant to the interface between the axle and the bearing, and means responsive to said relative motion between the bearing and the member and coupled to said pump actuating means to operate said device thereby to supply a lubricant under positive pressure of said interface.

3. In a railroad bearing assembly, a journal box, an axle supported for rotation in a bearing within said box, a load-supporting member within said box, means interposed between the bearing and the member permitting relative motion therebetween when a load supported by said member is subjected to a change in the tractive force supplied to it, a pumping device disposed within said box and having actuating means and a conduit coupling said device to said bearing to supply lubricant to the interface between the axle and the bearing, and means within said box responsive to said relative motion between the bearing and the load and coupled to said actuating means to operate said device thereby to supply a lubricant under positive pressure to said interface.

4. In a railroad bearing assembly, a journal box, an axle supported for rotation in a bearing within said box, a load-supporting member within said box, elastic means interposed between the bearing and the member permitting relative motion therebetween about an axis substantially parallel to the axis of said axle when a load supported by said member is subjected to a change in the tractive force supplied to it, a pumping device disposed within said box and having actuating means and a conduit coupling said device to said bearing to supply lubricant to the interface between the axle and the bearing, and means within said box responsive to said relative motion between the bearing and the load and coupled to said actuating means to operate said device thereby to supply a lubricant under positive pressure to said interface.

5. In a railroad bearing assembly, as set forth in claim 4, wherein said pumping device includes a reciprocating plunger and wherein said actuating means is constituted by an arm secured to said bearing and pivotally connected to said plunger whereby movement of said bearing relative to said member effects reciprocation of said plunger.

6. In a railroad bearing assembly, a journal box, an axle supported for rotation in a cylindrical bearing within said box, the outer surface of said bearing having a predetermined curvature, a load-supporting member imposed on said outer surface of said bearing and having a curved under surface engaging the outer surface of said bearing, said under surface having a larger radius of curvature than said outer surface thereby permitting relative motion of the bearing and the member about an axis substantially parallel to the axis of said axle when a load supported by said member is subjected to a change in the tractive force supplied to it, a pumping device having actuating means and a conduit coupling said device to said bearing to supply lubricant to the interface between the axle and the bearing, and means within said box responsive to said relative amount and coupled to said actuating means to operate said device to supply lubricant under positive pressure to said interface.

7. In a bearing assembly, a journal box, an axle supported for rotation in a bearing within said box, a load-supporting member, means interposed between said bearing and said member permitting relative motion therebetween, a sump disposed within said box adapted to contain a lubricant, a pumping device having actuating means and conduit means coupling said sump through said pumping device to said bearing for impelling lubricant from said sump to the interface between the axle and the bearing, and means responsive to said relative motion and coupled to said actuating means to operate said device.

References Cited in the file of this patent
UNITED STATES PATENTS

| | | |
|---|---|---|
| 1,265,199 | Hennessy | May 7, 1918 |
| 2,239,646 | Cottrell | Apr. 22, 1941 |
| 2,547,555 | Belknap | Apr. 3, 1951 |